US011787118B2

(12) United States Patent
Rodgers

(10) Patent No.: US 11,787,118 B2
(45) Date of Patent: Oct. 17, 2023

(54) APPARATUS, SYSTEM AND METHOD OF ADDITIVE MANUFACTURING USING ULTRA-FINE JETTED MATERIAL

(71) Applicant: JABIL INC., St. Petersburg, FL (US)

(72) Inventor: Luke Rodgers, St. Petersburg, FL (US)

(73) Assignee: JABIL INC., St. Petersburg, FL (US)

( * ) Notice: Subject to any disclaimer, the term of this patent is extended or adjusted under 35 U.S.C. 154(b) by 0 days.

(21) Appl. No.: 18/090,125

(22) Filed: Dec. 28, 2022

(65) Prior Publication Data

US 2023/0158743 A1 May 25, 2023

Related U.S. Application Data

(63) Continuation of application No. 17/417,053, filed as application No. PCT/US2019/067325 on Dec. 19, 2019, now abandoned.

(60) Provisional application No. 62/782,843, filed on Dec. 20, 2018.

(51) Int. Cl.
*B29C 64/295* (2017.01)
*B33Y 30/00* (2015.01)
*B29C 64/205* (2017.01)
*B29C 64/165* (2017.01)

(52) U.S. Cl.
CPC .......... *B29C 64/295* (2017.08); *B29C 64/205* (2017.08); *B33Y 30/00* (2014.12); *B29C 64/165* (2017.08)

(58) Field of Classification Search
CPC ... B29C 64/112; B29C 64/205; B29C 64/209; B29C 64/295; B29C 64/321; B33Y 10/00; B33Y 30/00; B33Y 40/00
See application file for complete search history.

(56) References Cited

U.S. PATENT DOCUMENTS

2008/0152910 A1* 6/2008 Hesse ..................... B22F 1/148 524/592
2009/0014916 A1* 1/2009 Nagai .................. B41M 7/0081 264/401
2016/0230283 A1* 8/2016 Tseliakhovich ....... B29C 64/106
2018/0184702 A1* 7/2018 Moh ...................... B33Y 80/00
2020/0016821 A1* 1/2020 Ohnishi ................. C09D 11/08
2020/0023397 A1* 1/2020 Hart ......................... B05D 3/14

FOREIGN PATENT DOCUMENTS

CN 108115138 * 6/2018
WO WO2015056230 * 4/2015

OTHER PUBLICATIONS

International Search Report for PCT/US2019/067325, dated Jun. 25, 2020 (Year: 2020).*
Written Opinion of the International Searching Authority for PCT/US2019/067325, dated Jun. 25, 2020 (Year: 2020).*

* cited by examiner

*Primary Examiner* — Mary Lynn F Theisen
(74) *Attorney, Agent, or Firm* — Riverside Law LLP

(57) ABSTRACT

An apparatus, system and method for additive manufacturing. The apparatus, system and method may include a solution dispenser comprising a carrier having embedded therein particles having a size of about 1-5 microns; a jet suitable to disperse the solution from the dispenser; and a tunable heat filter suitable to burn off the carrier, and make molten the particles, as the solution passes therethrough; wherein an additive manufacturing print build receives the molten particles.

1 Claim, 2 Drawing Sheets

APPARATUS, SYSTEM AND METHOD OF ADDITIVE MANUFACTURING USING ULTRA-FINE JETTED MATERIAL

CROSS-REFERENCE TO RELATED APPLICATIONS

The present application claims benefit of priority to U.S. patent application Ser. No. 17/417,053, filed Jun. 21, 2021, entitled: "Apparatus, System and Method of Additive Manufacturing Using Ultra-Fine Jetted Material," which is a national stage of International Application No. PCT/US2019/067325, filed Dec. 19, 2019, entitled: "Apparatus, System and Method of Additive Manufacturing Using Ultra-Fine Jetted Material," which claims priority to U.S. Provisional Application No. 62/782,843, filed Dec. 20, 2018, entitled: "Apparatus, System and Method of Additive Manufacturing Using Ultra-Fine Jetted Material," the entirety of which is incorporated herein by reference as if set forth in its entirety.

BACKGROUND

Field of the Disclosure

The present disclosure relates to additive manufacturing, and, more specifically, to an apparatus, system and method of additive manufacturing using ultra-fine jetted material.

Description of the Background

Three-dimensional (3D) printing is any of various processes in which material is joined or solidified under computer control to create a three-dimensional object. The 3D print material is "added" onto a base, such as in the form of added liquid molecules or layers of powder grain or melted feed material, and upon successive fusion of the print material to the base, the 3D object is formed. 3D printing is thus a subset of additive manufacturing (AM).

A 3D printed object may be of almost any shape or geometry, and typically the computer control that oversees the creation of the 3D object executes from a digital data model or similar additive manufacturing file (AMF) file, i.e., a "print plan". Usually this AMF is executed on a layer-by-layer basis, and may include control of other hardware used to form the layers, such as lasers or heat sources.

There are many different technologies that are used to execute the AMF. Exemplary technologies may include: fused deposition modeling (FDM); stereolithography (SLA); digital light processing (DLP); selective laser sintering (SLS); selective laser melting (SLM); high speed sintering (HSS); inkjet print and/or material/particle jetting manufacturing (IPM or MJ); laminated object manufacturing (LOM); and electronic beam melting (EBM).

Some of the foregoing methods melt or soften the print material to produce the print layers. For example, in FDM, the 3D object is produced by extruding small beads or streams of material which harden to form layers. A filament of thermoplastic, wire, or other material is fed into an extrusion nozzle head, which typically heats the material and turns the flow on and off.

Other methods, such as laser or similar beam-based or sintering techniques, may heat or otherwise activate the print material, such as a print powder, for the purpose of fusing the powder granules into layers. For example, such methods may melt the powder using a high-energy laser to create fully dense materials that may have mechanical properties similar to those of conventional manufacturing methods. SLS, for example, uses a laser to solidify and bond grains of plastic, ceramic, glass, metal or other materials into layers to produce the 3D object. The laser traces the pattern of each layer slice into the bed of powder, the bed then lowers, and another layer is traced and bonded on top of the previous.

In contrast, other similar methods, such as IPM, may create the 3D object one layer at a time by spreading a layer of powder, and printing a binder in the cross-section of the 3D object. This binder may be printed using an inkjet-like process.

Material jetting (MJ) is similar to 2D printing, such as using an inkjet printer, but instead of jetting drops of ink onto paper, MJ jets many droplets of photosensitive liquid material, typically thermoset photopolymers, onto the print build. Typically, multiple print heads jet material simultaneously to create each layer, and then ultraviolet (UV) light is used to cure the layers. The layers build up one at a time to create a 3D output.

Unlike most additive manufacturing technologies, MJ deposits material in a line-wise fashion. Multiple jetting printheads may be attached to same carrier side-by-side to deposit multiple print materials on the whole print bed in a single pass. Thus, multi-material printing, full-color printing and dispensing of dissolvable support structures is available with MJ.

Fully cured MJ models may typically be handled and used immediately without additional post-curing. Along with the selected print materials, a gel-like support material may facilitate the successful printing of complicated geometries.

MJ is presently the only additive manufacturing technology that allows for the combining different print materials within the same 3D print in the same print process. Further, it should be noted that a variation of MJ uses Drop-On-Demand (DOD) printheads to dispense viscous liquids and create wax-like parts.

SUMMARY

The embodiments are and include at least an apparatus, system and method of jetting ultra-fine particles for additive manufacturing. The apparatus, system and method may include a solution dispenser comprising a carrier having embedded therein particles having a size of about 1-5 microns; a jet suitable to disperse the solution from the dispenser; and a tunable heat filter suitable to burn off the carrier, and make molten the particles, as the solution passes therethrough; wherein an additive manufacturing print build receives the molten particles.

BRIEF DESCRIPTION OF THE DRAWINGS

The disclosed non-limiting embodiments are discussed in relation to the drawings appended hereto and forming part hereof, wherein like numerals indicate like elements, and in which.

DETAILED DESCRIPTION

Figure 1:
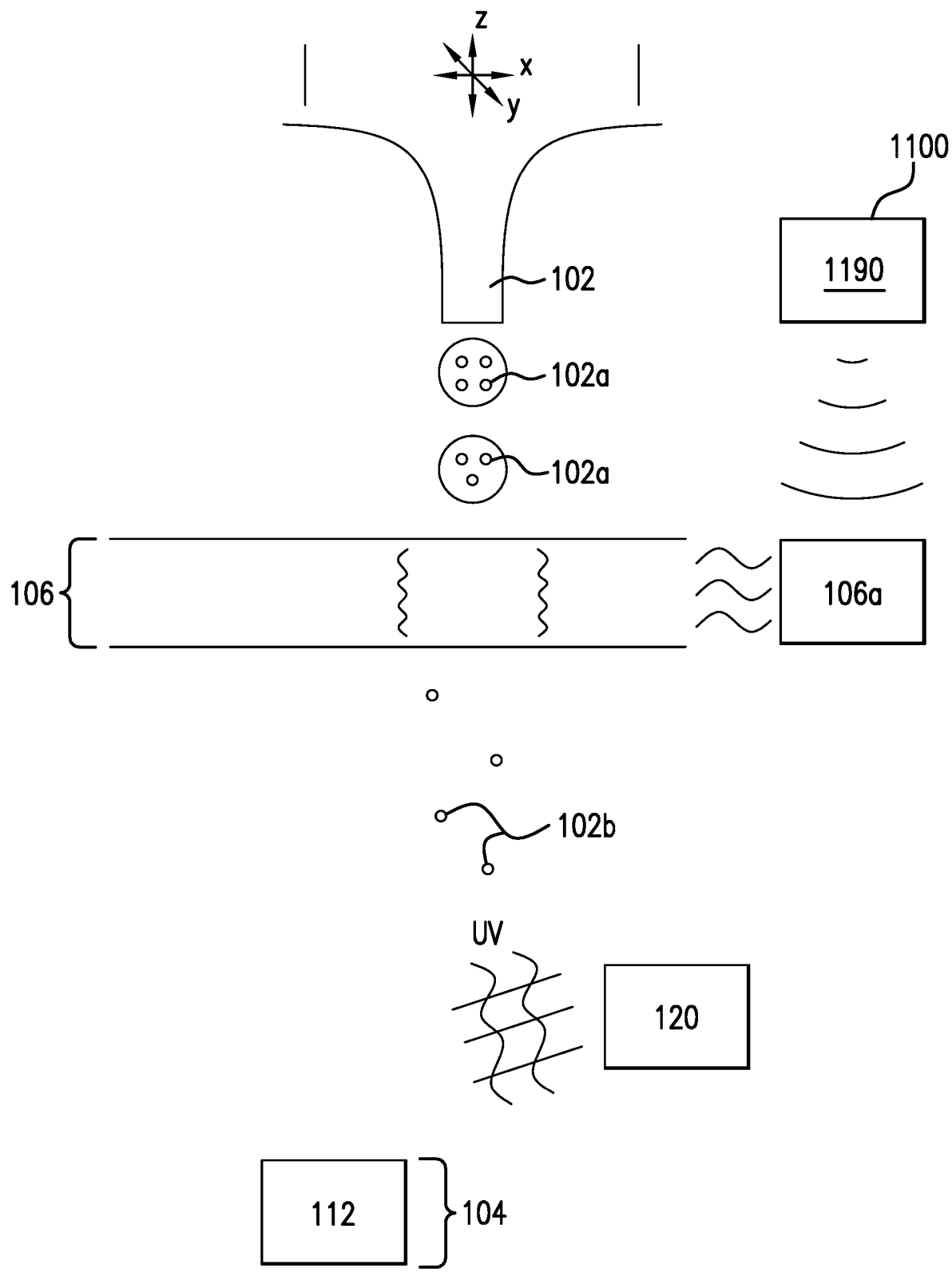
FIG. 1 is an illustration of an additive manufacturing system.

The figures and descriptions provided herein may have been simplified to illustrate aspects that are relevant for a clear understanding of the herein described apparatuses, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, for the sake of brevity a discussion of such elements and operations may not be provided herein. However, the present disclosure is deemed to nevertheless include all such elements, variations, and modifications to the described aspects that would be known to those of ordinary skill in the art.

Embodiments are provided throughout so that this disclosure is sufficiently thorough and fully conveys the scope of the disclosed embodiments to those who are skilled in the art. Numerous specific details are set forth, such as examples of specific components, devices, and methods, to provide a thorough understanding of embodiments of the present disclosure. Nevertheless, it will be apparent to those skilled in the art that certain specific disclosed details need not be employed, and that embodiments may be embodied in different forms. As such, the embodiments should not be construed to limit the scope of the disclosure. As referenced above, in some embodiments, well-known processes, well-known device structures, and well-known technologies may not be described in detail.

The terminology used herein is for the purpose of describing particular embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred or required order of performance. It is also to be understood that additional or alternative steps may be employed, in place of or in conjunction with the disclosed aspects.

When an element or layer is referred to as being "on", "engaged to", "connected to" or "coupled to" another element or layer, it may be directly on, engaged, connected or coupled to the other element or layer, or intervening elements or layers may be present, unless clearly indicated otherwise. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). Further, as used herein the term "and/or" includes any and all combinations of one or more of the associated listed items.

Yet further, although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the embodiments.

The disclosed apparatus, system and method provide for additive manufacturing using jetting of ultra-fine particles in solution/suspension. As referenced above, aspects of additive manufacturing may include material jet (MJ) printing technologies, wherein particles are "jetted" and UV cured in a pattern to form an additively manufactured output. As will be appreciated, such jetted particles may be patterned or refined by any known methods, including the aforementioned ultraviolet (UV) curing.

However, although known methods of MJ do provide the substantial optionality referenced above, including multi-jet, multi-material printing, known MJ suffers from an inability for highly refined additive manufacturing, at least because the jetted droplets, having therein the print material particles, do not lend themselves to the use of immiscible powders/ultra-fine particles, such as particles on the order of one to two microns. More specifically, in prior art embodiments, droplets having therein particles on the order of greater than 10 microns are jetted onto the print build for UV curing, which, in the event the UV curing is misdirected or improperly tuned, may lead to caking and clumping of the large particles jetted within the droplets.

Accordingly and as shown in FIG. 1, the embodiments provide a highly refined print methodology that employs ultrafine print particles 102a in a heat-filtered solution 102 that avoids caking or clumping of the printed output 104. As illustrated, ultrafine particles 102a, such as on the order of one to two microns, and such as may comprise polypropylene, by way of non-limiting example, are suspended in a jetted solution 102. The solution 102 may be of any format suitable to embed or suspend therewithin the ultrafine print particles 102a described herein. A carrier with solvated polymer may be used as jetted droplets.

Also illustrated is a heat filtering zone 106 (which may be applied by heater 106a) through which the jetted droplets 102 pass. As used herein, the heat filtering zone 106 may be any type of heat, such as infrared heat, may comprise a plane or a discrete zone/range, may comprise multiple zones employing different temperatures or different types of heat, or may comprise different types of heating methodologies per zone, such as infrared. Moreover, the heat filter 106 discussed herein may be tunable; that is, the heat filter may deliver heat energy at a selected frequency or frequencies, at a selected temperature or temperatures, or the like. The tunability of the heat filter 106 may be selected manually, such as by the user interacting with the control system 1100 described herein, or may be selected automatically by the control system 1100 described herein in accordance with a knowledge of the print material, print rates, print head speeds, or other aspects of print plan 1190, for example.

The heat filtering 106 described herein may serve to drive off the carrier/solvent/suspension, or any other aspects in which the fine print material particles 102a described herein are embedded. The carrier may comprise, by way of non-limiting example, water.

It may further be desired that the heat filtering 106 makes molten the fine particle 102a as the particle 102a passes through the heat filtering 106 and is subjected to removal of the carrier therefrom. These molten particles 102b, such as may comprise thermoplastics, may then be jetted onto the print build 112 and may cool and/or be actuated by a UV source 120 upon arrival, thereby "drying" (solidifying) into the predetermined pattern of print plan 1190 while awaiting arrival of the next molten fine particle/particles 102*b* from the print solution 102. Thereby, the print build 112 may receive molten fine thermoplastics 102*b* jetted from the solution 102 "above" the heat filtering, i.e., from the side of the print processing opposite print build 112, in the embodiments.

It will be appreciated that the heat filtering may take forms other than nonphysical layers. By way of example, a heat block filter may be provided as heat filtering 106, such as may have one or multiple levels of suitably-sized filtering holes along a heated substrate. Thereby, upon arrival of the solution at the top most level of the heat block filter 106, the carrier is removed and the print particles made molten as the jetted solution passes through the heat block filter 106.

Although aspects of the embodiments are described above with respect to ultrafine particles of one to two microns, it will be understood that the embodiments may be employed using particles of less than 10 microns, and more preferably less than 5 microns. By way of example, it may be optimal, if the carrier described above is water, that the fine print particles in the water solution be of less than 5 microns.

It will further be appreciated, in light of the discussion herein, that the embodiments avoid the physical impossibility of a molten polymer in a water solution, at least in that the water carrier is driven off by the heat filter before the polymer becomes molten. Of course, it will be understood in light of the foregoing discussion that the solution described need not be water-based in the embodiments.

Figure 2:
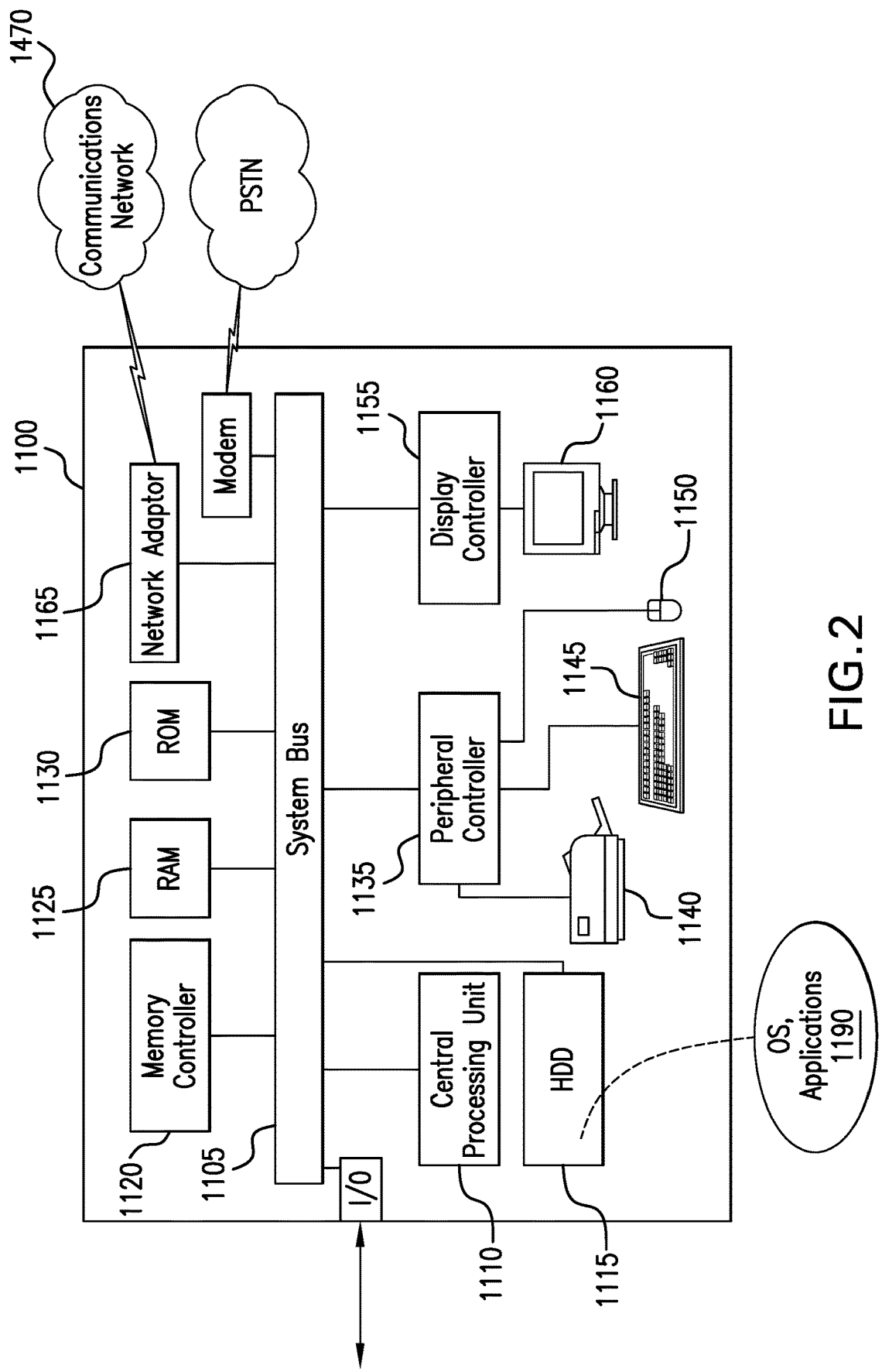
FIG. 2 illustrates an exemplary computing system.

FIG. 2 depicts an exemplary computing and control system 1100 for use in association with the herein described systems and methods. Computing system 1100 is capable of executing software, such as an operating system (OS) and/or one or more computing applications/algorithms 1190, such as applications applying the print plan, monitoring, process controls, process monitoring, and process modifications discussed herein, and may execute such applications 1190 using data, such as materials and process-related data, which may be stored 1115 locally or remotely.

More particularly, the operation of an exemplary computing system 1100 is controlled primarily by computer readable instructions, such as instructions stored in a computer readable storage medium, such as hard disk drive (HDD) 1115, optical disk (not shown) such as a CD or DVD, solid state drive (not shown) such as a USB "thumb drive," or the like. Such instructions may be executed within central processing unit (CPU) 1110 to cause computing system 1100 to perform the operations discussed throughout. In many known computer servers, workstations, personal computers, and the like, CPU 1110 is implemented in an integrated circuit called a processor.

It is appreciated that, although exemplary computing system 1100 is shown to comprise a single CPU 1110, such description is merely illustrative, as computing system 1100 may comprise a plurality of CPUs 1110. Additionally, computing system 1100 may exploit the resources of remote CPUs (not shown), for example, through communications network 1470 or some other data communications means.

In operation, CPU 1110 fetches, decodes, and executes instructions from a computer readable storage medium, such as HDD 1115. Such instructions may be included in software, such as an operating system (OS), executable programs such as the aforementioned correlation applications, and the like. Information, such as computer instructions and other computer readable data, is transferred between components of computing system 1100 via the system's main data-transfer path. The main data-transfer path may use a system bus architecture 1105, although other computer architectures (not shown) can be used, such as architectures using serializers and deserializers and crossbar switches to communicate data between devices over serial communication paths. System bus 1105 may include data lines for sending data, address lines for sending addresses, and control lines for sending interrupts and for operating the system bus. Some busses provide bus arbitration that regulates access to the bus by extension cards, controllers, and CPU 1110.

Memory devices coupled to system bus 1105 may include random access memory (RAM) 1125 and/or read only memory (ROM) 1130. Such memories include circuitry that allows information to be stored and retrieved. ROMs 1130 generally contain stored data that cannot be modified. Data stored in RAM 1125 can be read or changed by CPU 1110 or other hardware devices. Access to RAM 1125 and/or ROM 1130 may be controlled by memory controller 1120. Memory controller 1120 may provide an address translation function that translates virtual addresses into physical addresses as instructions are executed. Memory controller 1120 may also provide a memory protection function that isolates processes within the system and isolates system processes from user processes. Thus, a program running in user mode may normally access only memory mapped by its own process virtual address space; in such instances, the program cannot access memory within another process' virtual address space unless memory sharing between the processes has been set up.

In addition, computing system 1100 may contain peripheral communications bus 1135, which is responsible for communicating instructions from CPU 1110 to, and/or receiving data from, peripherals, such as peripherals 1140, 1145, and 1150, which may include printers, keyboards, and/or the sensors discussed herein throughout. An example of a peripheral bus is the Peripheral Component Interconnect (PCI) bus.

Display 1160, which is controlled by display controller 1155, may be used to display visual output and/or other presentations generated by or at the request of computing system 1100, such as in the form of a GUI, responsive to operation of the aforementioned computing program(s). Such visual output may include text, graphics, animated graphics, and/or video, for example. Display 1160 may be implemented with a CRT-based video display, an LCD or LED-based display, a gas plasma-based flat-panel display, a touch-panel display, or the like. Display controller 1155 includes electronic components required to generate a video signal that is sent to display 1160.

Further, computing system 1100 may contain network adapter 1165 which may be used to couple computing system 1100 to external communication network 1170, which may include or provide access to the Internet, an intranet, an extranet, or the like. Communications network 1170 may provide user access for computing system 1100 with means of communicating and transferring software and information electronically. Additionally, communications network 1470 may provide for distributed processing, which involves several computers and the sharing of workloads or cooperative efforts in performing a task. It is appreciated that the network connections shown are exemplary and other means of establishing communications links between computing system 1100 and remote users may be used.

Network adaptor 1165 may communicate to and from network 1470 using any available wired or wireless technologies. Such technologies may include, by way of non-limiting example, cellular, Wi-Fi, Bluetooth, infrared, or the like.

It is appreciated that exemplary computing system 1100 is merely illustrative of a computing environment in which the herein described systems and methods may operate, and does not limit the implementation of the herein described systems and methods in computing environments having differing components and configurations. That is to say, the inventive concepts described herein may be implemented in various computing environments using various components and configurations.

In the foregoing detailed description, it may be that various features are grouped together in individual embodiments for the purpose of brevity in the disclosure. This method of disclosure is not to be interpreted as reflecting an intention that any subsequently claimed embodiments require more features than are expressly recited.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

What is claimed is:

1. An apparatus for additive manufacturing printing, comprising:

a solution dispenser comprising a carrier having embedded therein particles having a size of about 1-5 microns;

a jet suitable to disperse the solution from the dispenser; and a tunable heat filter suitable to burn off the carrier, and make molten the particles, as the solution passes therethrough, the tunable heat filter comprising, at least in part, a physical filter block, and wherein an additive manufacturing print build receives the molten particles; and an ultraviolet actuator to actuate the molten particles upon receipt at the additive manufacturing print build.

* * * * *